(12) United States Patent
Gottlieb et al.

(10) Patent No.: US 7,504,036 B2
(45) Date of Patent: Mar. 17, 2009

(54) METHOD OF MAKING AND USING MODIFIED ANION EXCHANGE MATERIALS WITH METAL INSIDE THE MATERIALS

(75) Inventors: Michael C. Gottlieb, Cherry Hill, NJ (US); Peter S. Meyers, Marlton, NJ (US)

(73) Assignee: ResinTech Incorporated, West Berlin, NJ (US)

( * ) Notice: Subject to any disclaimer, the term of this patent is extended or adjusted under 35 U.S.C. 154(b) by 0 days.

(21) Appl. No.: 11/962,764

(22) Filed: Dec. 21, 2007

(65) Prior Publication Data

US 2008/0169241 A1    Jul. 17, 2008

Related U.S. Application Data

(62) Division of application No. 11/089,228, filed on Mar. 24, 2005.

(60) Provisional application No. 60/603,161, filed on Aug. 20, 2004.

(51) Int. Cl.
*B01J 49/00*    (2006.01)

(52) U.S. Cl. .................. 210/688; 521/26; 521/30; 521/25

(58) Field of Classification Search .......... 521/25, 521/26, 30; 210/688
See application file for complete search history.

(56) References Cited

U.S. PATENT DOCUMENTS

| | | |
|---|---|---|
| 3,865,853 A | 2/1975 | Hinze |
| 3,873,668 A | 3/1975 | Melby |
| 4,073,752 A | 2/1978 | Ramp |
| 4,111,856 A | 9/1978 | Haag et al. |
| 4,116,856 A | 9/1978 | Lee et al. |
| 4,116,857 A | 9/1978 | Lee et al. |
| 4,116,858 A | 9/1978 | Lee et al. |
| 4,145,486 A | 3/1979 | Haag et al. |
| 4,159,311 A | 6/1979 | Lee et al. |
| 4,183,900 A | 1/1980 | Lee et al. |
| 4,243,555 A | 1/1981 | Lee et al. |
| 4,311,811 A | 1/1982 | Manziek |
| 4,311,812 A | 1/1982 | Manziek |
| 4,333,847 A | 6/1982 | Tran et al. |
| 4,347,327 A | 8/1982 | Lee et al. |
| 4,355,140 A | 10/1982 | Manziek |
| 4,366,261 A | 12/1982 | Beale, Jr. |
| 4,410,665 A | 10/1983 | Manziek |
| 4,446,252 A | 5/1984 | Beale, Jr. |
| 4,544,499 A | 10/1985 | Tran et al. |
| 4,629,741 A | 12/1986 | Beale, Jr. |
| 4,640,945 A | 2/1987 | Peiffer et al. |
| 4,659,477 A | 4/1987 | Macedo et al. |
| 4,663,086 A | 5/1987 | Lefillatre |
| 5,141,966 A | 8/1992 | Porath |
| 5,419,816 A | 5/1995 | Sampson et al. |
| 5,561,168 A | 10/1996 | Fish et al. |
| 5,609,742 A | 3/1997 | Sampson et al. |
| 5,721,305 A | 2/1998 | Eshuis et al. |
| 5,872,295 A | 2/1999 | Michelotti et al. |
| 6,024,850 A | 2/2000 | Sampson et al. |
| 6,077,809 A | 6/2000 | Suzuki et al. |
| 6,130,175 A | 10/2000 | Rusch et al. |
| 6,136,907 A | 10/2000 | Sunamori et al. |
| 6,323,249 B1 | 11/2001 | Dale et al. |
| 6,402,916 B1 | 6/2002 | Sampson et al. |
| 6,416,645 B1 | 7/2002 | Sampson et al. |
| 6,558,552 B1 | 5/2003 | Loos-Neskovic et al. |
| 7,291,578 B2 | 11/2007 | SenGupta et al. |
| 2005/0156136 A1 | 7/2005 | SenGupta et al. |

FOREIGN PATENT DOCUMENTS

| | | |
|---|---|---|
| EP | 0650929 A1 | 10/1994 |
| EP | 0650929 B1 | 10/1994 |
| EP | 1118585 B1 | 10/1994 |
| EP | 0900249 B1 | 4/1997 |
| EP | 1194236 B1 | 5/2000 |
| GB | 1215415 A | 12/1970 |
| GB | 1346936 A | 12/2007 |
| WO | WO 93/11287 | 6/1993 |

(Continued)

OTHER PUBLICATIONS

Sengupta, A. et al., Value Added Products from Innovative Applications of Donnan Membrane Principle, Department of Chemical Engineering, Lehigh University, Bethlehem, PA, Oct. 2005.*

(Continued)

*Primary Examiner*—Chester T Barry
(74) *Attorney, Agent, or Firm*—Caesar, Rivise, Bernstein, Cohen & Pokotilow, Ltd.

(57) ABSTRACT

The present invention relates, generally, to the art of impregnating metal complexes into anion exchange materials to provide improved anion exchange materials with a metal inside the materials such that the modified materials effectively and efficiently remove or recover various metals, including metal containing complexes, compounds, and contaminants, such as arsenic, from, for example, process solutions, effluents and aqueous solutions. Uses for the improved anion exchange materials are also described as are methods of making modified anion exchange materials, and methods of removing and recovering at least one metal or contaminant from a source.

12 Claims, No Drawings

FOREIGN PATENT DOCUMENTS

| | | |
|---|---|---|
| WO | WO 00/71255 A1 | 5/2000 |
| WO | WO 2004/110623 A1 | 12/2004 |

OTHER PUBLICATIONS

Chanda et al. "Ligand Exchange Sorption Of Arsenate And Arsenite Anions By Chelating Resins In Ferric Ion Form: I. Weak-Base Chelating Resin DOW XFS-4195", Reactive Polymers 7 (1988) 251-261, Elsevier Science Publishers B.V.—Amsterdam.

The Dow Chemical Company, Liquid Separations Product Information—DOWEX Resins for Separation of Arsenic from Liquid Media Liquid Separations: Product Information—DOWEX Resins for Separation of Arsenic from Liquid Media, p. 1-2 (1995-2004).

Demarco et al. "Arsenic removal using a polymeric/inorganic hybrid sorbent", Water Research 37 (2003) 164-176, Elsevier Science Ltd.

Meng et al. "Treatment of Arsenic in Bandladesh Well Water Using a Household Co-precipitation and Filtration System", Water Research, vol. 35, 2805-2810, 2001.

Massachusetts Institute of Technology,. Online Informational Database, "General Processes for Arsenic Removal," p. 1-4 (2001).

Meyers, "Arsenic Removal," EWQA April Seminar Powerpoint Presentation, ResinTech, Inc., Apr. 15, 2003, p. 1-3.

Twidwell et al., "Technologies and Potential Technologies for Removing Arsenic from Process and Mine Wastewater," paper presented at "REWAS'99": San Sebastian, Spain, Sep. 5-9, 1999.

Chanda et al. "Ligand Exchange Sorption Of Arsenate And Arsenite Anions By Chelating Resins In Ferric Ion Form: ii. Iminodiacetic Chelating Resin Chelex 100," Reactive Polymers, 8 (1988) 85-95, Elsevier Science Publishers B.V. Amsterdam.

Ramana et al. "Removing Selenium(IV) And Arsenic(V) Oxyanions With Tailored Chelating Polymers," ASME, Part of the Journal of Environmental Engineering, col. 118, No. 5, Sep./Oct. 1992.

International Search Report issued in corresponding International Application No. PCT/US2005/009847 and mailed on Aug. 12, 2005.

Sengupta et al. "A New Polymeric/Inorganic Hybrid Sorbent for Selective Arsenic Removal," Proceedings of Iex. Ion Exchange at the Millenium, 2000, pp. 142-149.

Min et al. "Arsenate sorption by Fe(III)-doped alginate gels," Water Research, Pergamon Press, Oxford, GB, vol. 32, No. 5, Mar. 1, 1998, pp. 1544-1552.

Cumbal, L. et al., Arsenic Removal Using Polymer-Supported Hydrated Iron(III) Oxide Nanoparticles: Role of Donnan Membrane Effect, Environ, Sci. Technol. 2005, 39, 6508-6515, Bethlehem, PA.

The Purolite Company "D-3777 Selective Anion Exchange Resin (for the removal of arsenic, selenium and molybderum salts from aqueous solutions)" D-37771299), p. 1-4, circa Dec. 16, 1999.

The Purolite Company "ArseneX" Product Sheet (1 page), circa Jul. 8, 2004.

* cited by examiner

METHOD OF MAKING AND USING MODIFIED ANION EXCHANGE MATERIALS WITH METAL INSIDE THE MATERIALS

RELATED APPLICATIONS

This application is a Divisional of U.S. patent application Ser. No. 11/089,228, filed Mar. 24, 2005, which claims the benefit of U.S. Provisional Patent Application No. 60/603,161, filed Aug. 20, 2004.

FIELD OF THE INVENTION

The present invention relates, generally, to polymeric anionic exchange materials, including resins, in which a metal complexing group or substance is not only present on the materials but is also located inside the materials. Also described are methods for making improved anionic exchange materials and for removing and recovering metals and contaminants from a source including, for example, ground and potable water.

BACKGROUND OF THE INVENTION

Arsenic, in its metallic form, does not occur in nature and in fact is practically of no commercial value. Arsenic trioxide, however, is a classic inorganic poison, which was used for many years to, among other things, control insects. Although some arsenic enters the environment from manmade sources, most arsenic contamination is naturally occurring. Arsenic in water is almost always anionic, and generally takes on one of two forms, either the "trivalent" arsenite anion or the "pentavalent" arsenate anion. The terms trivalent and pentavalent refer to the valence of the arsenic in the arsenite and arsenate. Arsenate is generally considered much easier to remove than arsenite.

In recent years, the presence of dissolved arsenic, as well as other contaminants, in groundwater has emerged as a major concern on a global scale. The concern stems, at least in part, from the fact that groundwater is a major source of potable water. According to the estimate of the United States Environmental Protection Agency (USEPA), the newly promulgated 10 ug/L arsenic maximum contaminant level (MCL) in drinking water would require corrective action for more than 4000 water supply systems serving approximately 20 million people. A vast majority of these systems are groundwater systems. Natural geochemical contamination through soil leaching is the primary contributor of dissolved arsenic in ground waters around the world.

On the other hand, recovered arsenic is an important commercial commodity, with about 70% of the end uses being wood preservatives and herbicides, while cotton desiccants, glass and flotation reagents account for some of the other uses. The major raw material used in these arsenic chemicals is arsenic trioxide, the world demand for which is estimated to be about 100,000 tons per year (as As). Practically all of this arsenic oxide is recovered from mineral processing residues, mostly from the flue dusts produced in the smelting of sulfide concentrates.

The removal and recovery of arsenic, as well as other metals and contaminants, from, for example, process solutions process solutions, effluents and aqueous solutions is thus an important process. Generally, there are several known methods for removing and recovering metals and contaminants including precipitation, co-precipitation, adsorption, liquid-liquid extraction and ion exchange. Traditional treatment methods for the removal of, for example, arsenic from water include coagulation in the presence of an iron salt, adsorption by activated alumina exchange by a strongly basic anion resin, and various membrane processes, such as reverse osmosis and electro-deionization. Methods of coagulation and filtration are also well documented.

All of the traditional treatment methods for the removal of metals and contaminants from, for example, process solutions, effluents and aqueous solutions have had varying success. For example, when properly constructed and operated, oxidation followed by iron coagulation and filtration can reduce as much as 95% of arsenic that may be present Other metals, such as aluminum and magnesium to name only a couple, can similarly remove arsenic. However, with any coagulation process, if upsets occur, the percentage of removal can be somewhat problematic. There is also the necessity to add iron salt if insufficient iron is present naturally and to deal with arsenic laden sludge generated by the process. Also, membrane processes are generally considered overly expensive for drinking water applications, unless reduction of total dissolved solids is desired. On the other hand, when membrane processes are employed for other reasons, their ability to remove arsenic provides an additional benefit. Ion exchange, although often touted for arsenic removal is limited, primarily because sulfate, which is present in most potable water, interferes strongly. Additionally, there are numerous inorganic adsorbent materials and medias that have demonstrated various degrees of success at removing metals from process solutions, effluents and aqueous solutions, for example.

Chanda et al. authored "Ligand Exchange Sorption Of Arsenate And Arsenite Anions By Chelating Resins In Ferric Ion Form: I. Weak-Base Chelating Resin Dow XFS-4195," Reactive Polymers, 8(1988) 251-261. Chanda et al. describe a weak base chelating resin which is activated by treatment with hydrochloric acid solution after which the resin is agitated in a solution of $FeCl_3$—$H_2O$ then rinsed with water. The resulting ferric polychelate resin is used to remove arsenic until exhausted and regenerated treated NaOH, washed and then protonated afresh with an acidified ferric chloride solution, rinsing with water and returning to service.

The Chanda et al. publication describes loading iron as a cation ($Fe^{+3}$) by chelation, not by ion exchange. The resin involved is functionalized with a chelating agent that is also an amine. The interaction with the resin and iron is by ligand bonding. The complex amine functionality also has weak base anion exchange characteristics but no anion exchange is involved in the reaction with iron. Since the resin is weakly basic, there is no electrostatic repulsion mechanism to prevent the positively charged iron from entering and bonding with the chelating groups. Also, the iron is loaded from dilute acidic solution which favors the $Fe^{+3}$ and avoids forming the complex $FeCl_4^-$ which is the opposite of the conditions used in the present invention where the iron is loaded as the $FeCl_4^-$ anionic complex. The fact that Chanda et al. rinse the iron laden resin with water as a final step also indicates that the iron is not in the form of an anionic complex. If it were such a complex, the complex would decompose and leave the resin free of iron.

Thus, Chanda et al. maintain iron in the $Fe^{+3}$ form (as a cation) and operate under acid conditions to stabilize the ligand bond. Regeneration of arsenic laden chelating resin is by contact with NaOH. However, this precipitates iron, which destroys the functionality of the resin. In order to reuse the resin, Chanda et al. must reload the iron by passing an acidified dilute ferric chloride solution, which solubilizes and removes the precipitated iron from the previous cycle. Some build up of iron is observed, primarily on the surface, which eventually causes a decrease in performance after a few cycles. Chanda et al. note this and describe a step of completely stripping the iron, including the precipitated iron, by rinsing the resin with dilute hydrochloric acid and starting anew.

In contrast, the present invention uses strongly basic resins, loads the iron from highly concentrated solutions with very high chloride salt concentrations specifically designed to form the $FeCl_4^-$ and to load the entire resin with the complex by ion exchange as an anion. The present invention also uses NaOH to precipitate the iron inside the gel phase of the resin. When the arsenic laden resin is regenerated to desorb the arsenic with NaOH, the iron remains unaffected. The alkaline regeneration process has no impact on the iron content of the resin because it is immobilized as a precipitate inside the resin and is insoluble in NaOH.

U.S. Pat. Nos. 4,116,856, 4,116,857, 4,116,858, 4,159, 311, 4,183,900, 4,243,555 and 4,347,327 of Lee et al. describe anion exchange resins having suspended therein microcrystalline $LiOH\cdot2Al(OH)_3$ and $MgX_2\cdot2Al(OH)_3$ structures for recovering lithium and magnesium ions, respectively, from brines. Lee et al. do not describe loading $AlCl_3$ on a resin. Instead, the resin is soaked in an $AlCl^3$ solution and then treated with a dilute solution of ammonium chloride and ammonium hydroxide to convert the aluminum to $Al(OH)_3$ which coats the surface of the resin. There is no complex anion formation. There is also no indication that aluminum undergoes any complex formation or is attracted by such a mechanism into an anion resin. The ammonia is sufficiently basic to precipitate the aluminum but not so basic as to re-dissolve it as an anion complex.

In order to create an anion complex from aluminum, one would have to raise the pH high enough to make the aluminum behave as an anionic complex-aluminate. This would be easy to do with a stronger alkali solution such as NaOH or KOH or pure $NH_4OH$. The mixture of $NH_4Cl$ with $NH_4OH$ lowers the pH so that the amphoteric state is avoided and aluminum stays on the surface. As such, it is impossible to migrate into the gel phase. Lee et al. confirm this stating that "small crystals formed in small pores, voids and spaces in the resin which are detectable by X-ray diffraction if not by microscope." In other words, the metal is not inside the gel phase of the resin as in the present invention.

U.S. Pat. Nos. 4,366,261, 4,446,252 and 4,629,741 of Beale, Jr. describe anion exchange resins having chromium III oxide ($Cr_2O_3\cdot nH_2O$) in the resin for removing metal cations from aqueous solutions. In the Beale patents, resin is soaked in a saturated solution of chromium chloride that is mixed with hydrated chromium chloride. The chromium is not able to load onto the anion resin as a chloride complex and it does not form anionic complexes with chloride. It is in the form of $Cr^{+3}$, $CrCl_3$ (dissociated) or as $CrCl_3$ (solid) as part of a supersaturated solution or slurry. After the soak, the solution is drained off by filtration, and the wet resin is dried. Clearly, the Beale patents describe a process for coating a resin surface with a foreign substance. However, it is unclear whether an anion resin is even required. Whether an inert polymer or a cation resin would perform as the substrate as well as an anion resin is not obvious to one of ordinary skill in the art. Instead, Beale points out the order of preference of the resin to be used is dependent upon the physical porosity of the resin. There is no mention of ion exchange capacity which clearly means that the physical surface area, not ion exchange capacity, is the most important factor as dictated by a process of surface coating.

All types of anion exchange materials used in, for example, adsorption columns that operate for many thousands of bed volumes are prone to fouling with suspended solids and operational problems, such as channeling. Since many types of anion exchange materials are able to reduce arsenic below 10 ppb, the materials that cost the least per pound are often favored by equipment suppliers. However, cost per pound is not always the best indicator of the effectiveness of an anion exchange material. As the date for implementing the newly promulgated 10 ug/L arsenic MCL in drinking water looms ever closer, available anionic exchange materials will come under closer scrutiny. Similarly, the maximum contamination levels of other contaminants will also require more efficient and improved anion exchange materials. Therefore, there is a need for improved anion exchange materials, improved methods of making anion exchange materials and improved methods of removing metals and contaminants from process solutions, effluents and aqueous solutions in general.

SUMMARY OF THE INVENTION

The present invention relates, generally, to the art of incorporating metal complexes on to and into anion exchange materials to provide improved compositions and modified anion exchange materials with a metal or metals inside the materials such that the modified materials effectively and efficiently remove various metals, in the form of, metal containing complexes, compounds, and contaminants, including arsenic, from, for example, process solutions, effluents and aqueous solutions. For example, metals which are effectively removed from an aqueous solution by the anion exchange materials of the present invention include substances containing polyvalent and monovalent transition metals.

The improved anion exchange materials of the present invention have at least one metal wherein at least a portion of the metal is inside the material. Such anion exchange materials may include, but are not limited to, anion exchange resins, membranes and structures. The anion exchange material with which one starts may be any particular water-insoluble polymeric material which contains strongly basic amine groups attached to the polymeric material including those described in more detail below. Such anion exchange materials are known to those of ordinary skill in the art and selection of a particular starting anion exchange material or structure is considered within the skill of those knowledgeable in this field.

Specifically, the present invention is directed to compositions and modified anion exchange materials having at least one metal wherein at least a portion of the metal is inside the material. For example, a strongly basic anion exchange resin bead impregnated with a metal containing substance is part of the present invention.

Another aspect of the invention relates to methods for making modified anion exchange materials after adding a metal containing substance to a salt, acid or base material to form an anionic substance comprising a metal containing complex. The method includes, but is not necessarily limited to loading the anionic substance comprising a metal containing complex on to and into an anion exchange material; and immobilizing or precipitating the metal containing complex inside the anionic substance to form a modified anion exchange material.

In other aspects of the invention, methods of removing and recovering at least one metal or contaminant from a source are described. For example, described herein are methods of removing and recovering a metal from a source comprising the steps of: exchanging anionic sites on a material with an anionic metal complex; immobilizing the anionic metal complex to maintain the metal inside the material forming a metal-material; and contacting the source with the metal-material.

Thus, the present invention provides low cost, very robust, modified anionic exchange materials having a metal inside the materials which are capable of functioning in a variety of apparatus as in a very wide range of operating conditions since the metal inside the exchange materials is not easily displaced from the material.

DETAILED DESCRIPTION OF THE INVENTION

The present invention relates, in part, to getting a metal to enter or go inside anion exchange materials in order to provide improved anion exchange materials. More specifically, the present invention relates to compositions and materials in which a complexing group containing a metal is not only attached on to but is also located, precipitated or immobilized inside an anionic exchange material. As used above, "complexing group" or simply "complex" means an atom, molecule, ion or chemical group which, upon being bonded, attached, sorbed or physically located at, close to or throughout the volume of a solid surface or a porous structure or support, the material causes a significant enhancement in the tendency of an ionic or neutral species to adhere to its surface or to become attached or occluded inside the porous solid. The mechanism by which this effect is achieved may consist of the formation of a coordinate covalent complex species, an insoluble or scarcely soluble compound, or a non-dissociated or weakly dissociated covalent or ionic species.

It is well known that anionic complexes of various metals, including tetrachloride, are attracted by anion exchange materials such as anion resins. However, the complex is often unstable and requires the presence of other substances in the solution to form and become stabilized. When these other substances are removed, the complex will disintegrate. The anionic complex form of the metal is necessary to get the metal inside the gel phase of the resin. For example, when an anionic resin containing an anionic complex is washed with water, the anionic complex is displaced or extricated from the resin. Therefore, although the materials may be in the metal complex form, the metal complex is not able to stay inside the materials. Accordingly, an important aspect of the present invention is to provide improved modified anionic exchange materials by methods which enable a metal to, not only be attracted to the surface of the materials, but also to go inside anion materials as an anionic complex, ultimately trapping the metal inside the materials as either a cation or as a neutral species. The loading and trapping steps can be repeated many times, thereby increasing the amount of metal trapped inside the resin beyond the stoichimetric limit. The amount of metal containing complex that can be loaded into the resin in a single step is only limited by the total ion exchange capacity of the resin. For example, if the resin has a total capacity of 1.5 equivalents per to liter then the maximum amount of ferric chloride complex that can be loaded in a single step is the same, 1.5 equivalents per liter of resin. When the complex is destroyed by reaction with an alkali material the amount of iron left behind (inside the gel phase of the resin) will be 1.5 moles of iron as iron per liter of resin (starting resin volume basis) since each equivalent of ferric chloride complex contains one atom of iron. This means that 1.5 times the atomic weight of an iron atom (55.8) or 83.7 grams of iron per liter of resin is left inside the gel phase of the resin. However, once the complex has been broken and the iron has been trapped the ion exchange capacity of the resin is once again available to engage in another cycle of loading and trapping.

By the present invention, metal levels in the resin well above the amount represented by the total capacity have been achieved in this very manner. For example, a solution of ferric chloride, sodium chloride and hydrochloric acid is combined with of ResinTech SBG1-Chloride and allowed to equilibrate for two or more hours. The solution is then drained from the resin and replaced with the same amount of a fresh solution of the same composition and again allowed to sit for 2 hours, drained and replaced as a multistage batch contact approach to loading the iron. The multi stage batch contacts just described can be repeated and each time the iron complex loaded on the resin will increase until, eventually the amount of iron complex loaded approaches the theoretical maximum. This is the exchange capacity of the resin. Similarly, a large volume of solution can be passed slowly thru the resin in a column operation until the resin is fully saturated with the complex and the exchange capacity of the resin is 100% in the ferric chloride complex form. Regardless of whether batch contacts or columnar operation is employed it may be found to be more practical to stop somewhat short of the theoretical maximum, "fix" the iron on the resin by reaction with sodium hydroxide. Once the iron is "fixed" the loading process can be repeated again to load the ferric chloride complex until it again approaches the total exchange capacity of the resin followed by fixing the iron. When the loading and fixation steps are repeated in this manner it is possible to achieve iron loading values far in excess of the theoretical capacity of the resin.

It is not well understood by those of ordinary skill in the art how one overcomes the cationic charge barrier, often referred to as the Donnan barrier, present inside an anion exchange material such that cations are able to penetrate the surface of an anion exchange material such as a resin bead. Thus, the present invention also relates to anion exchange materials which are very selective such that certain complex anions that contain at least one metal atom as part of the complex are transferred or exchanged past the Donnan barrier and into the anion exchange material. The anion exchange material can be either in the same or different ionic form as the metal containing complex. Accordingly, a surprising and unexpected benefit of the modified anion exchange materials of the present invention is that a metal is contained or trapped in the exchange material in a solid state but is still able to take part as though it were finely dispersed within the exchange material. Meanwhile, the anion exchange material continues to function in a similar or the same manner as it was capable of functioning prior to containing the metal. In other words, the anion exchange material with the metal inside the material, as described in more detail below, acts as both its original anion exchange material and as a highly selective adsorbent for certain anion containing metals.

The modified anion exchange materials of the present invention can be used with a variety of apparatus and have wide point of use applications including, for example, the treatment of municipal water supplies and water plumbing systems, such as water distributors, cooling towers, etc., as well as point of use applications in other fields, including sanitization and sterilization, such as medical, dental and veterinary disinfection and sterilization, surface and instrument disinfection and sterilization, hot and cold water sanitization, dental water line sanitization, membrane sanitization and sterilization, as well as food and animal disinfection, bacteria control, waste treatment, and ionic purification of aqueous solutions. It will be appreciated by those skilled in the art that other uses of the modified anion exchange materials of the present invention are possible without departing from the broad invention concept thereof.

A primary purpose of the present invention is to provide an improved anion exchange material which effectively and efficiently reacts with or adsorbs arsenic (both in the form of arsenate and of arsenite) such that arsenic can be removed from aqueous sources such as ground water. In addition to effectively and efficiently reacting with arsenic, the improved anion exchange material of the present invention can also effectively and efficiently react with or adsorb other metals, including but not limited to, selenium, fluoride, phosphate, silicate, fluoborate, cyanide, cyanate, oxyanions and other similar contaminants from various sources some of which are described above. The modified anion exchange materials of the present invention are also useful as oxidation-reduction or redox media and as catalysts for various chemical reactions.

As used herein, the term "material" as used in "anion exchange material" includes granules, beads, grains and powders. These materials can be macroporous but are preferably gel-type materials. The anion exchange materials of the present invention are preferably anion exchange resins which are formed by the chloromethylation and amination of an organic polymer, such as polystyrene. The underlying polymer may contain ring-based materials, such as benzene rings, or non-ring based materials, such as, but not limited to, acrylic acid or methacrylic acid. Polymerization of an aromatic amine and an aldehyde or by polymerization of a polyamine, a phenol and an aldehyde is also possible. Such resins have a large number of electrically charged functional groups disbursed throughout their structure. In general, the extent of polymerization or condensation in the resins is carefully controlled so that a limited amount of cross-linking occurs to render the resins insoluble in water or any other polar solvent with which they are to be employed but leaving them capable of absorbing water or other solvents so as to swell therein. The presence of water or other polar solvents absorbed in the resins causes or enables ionic mobility throughout the resin bead so that the mobile ions can interact with the functional groups and can be exchanged for other anions from the resin. For example, a resin in the hydroxide form can exchange its hydroxide ions for an equivalent amount of chloride or sulfate ions.

The anion exchange materials suitable for preparing the modified materials of the present invention are organic porous materials with ionic charges and anion exchange capacity. Preferably, the anion exchange materials are polymer-based and, as described above, are sometimes referred to as anion exchange resins. Polymer-based anion exchange materials are commercially available or can be readily prepared from materials that are commercially available and cover a broad spectrum of different anion exchange materials with varying exchange capacity, porosity, pore size and particle size.

All anion exchange resins contain a gel phase, which is the name commonly used to describe the interior of an ionically charged polymer. The polymer itself is sufficiently porous on a molecular scale to allow ions to travel freely through out the particle. Macroporous resins also have physical porosity. Materials, especially resins, with physical porosity are typically referred to as "macroporous" or "macro reticular." The terms "macroporous" and "macro reticular" are typically used interchangeably. As the term is commonly used in the art, "macro reticular" generally means that the pores, voids, or reticules are substantially within the range of about 200 to about 2,000 Å. Materials without physical porosity are referred to "gel types." The gel-phase of organic anion exchange materials are particularly preferred in the practice of the present invention which applies to both macroporous and gel type resins since they are usually less expensive and in some cases offer higher operating capacity.

Anion exchange resins are characterized as either strong base or weak base anion exchange resins depending on the active ion exchange sites of the resin. The resin matrix of weak base anion-exchange resins contain chemically bonded thereto a basic, nonionic functional group. The functional groups include primary, secondary, or tertiary amine groups. These may be aliphatic, aromatic, heterocyclic or cycloalkane amine groups. They may also be diamine, triamine, or alkanolamine groups. The amines, for example, can include alpha, alpha-dipyridyl, guanidine, and dicyanodiamidine groups. Other nitrogen-containing basic, non-ionic functional groups include nitrite, cyanate, isocyanate, thiocyanate, isothiocyanate, and isocyanide groups. Pyridine groups may also be employed.

Strong base anion exchange resins consist of polymers having mobile anions, such as chloride, bicarbonate, hydroxide and the like, associated for example with covalently bonded quaternary ammonium, phosphonium or arsonium functional groups or tertiary sulfonium functional groups. These functional groups are known as active sites and are distributed through out the volume of the resin. Strong base anion-exchange resins have the capacity to undergo ion exchange independent of the pH of the medium which surrounds the resins by virtue of their intrinsic ionic character. Strong base anion exchange resins in the chloride form are preferred in the practice of the present invention. However, regardless of the initial ionic form, a resin will be converted to both the counter ion ($Cl^-$) and the metal containing complex anion ($FeCl_4^-$) forms by the complex containing solution during the loading process with virtually the same result as if the resin had started in the counter ion ($Cl^-$) form. Also, a small amount of complexed iron can be directly loaded into the resin by using the hydroxide form of the resin if the initial loading of the complex on to the resin is followed by subsequent precipitation by the remaining hydroxide capacity. However, it is expected that this procedure would be limited to a fraction of the potential loading capacity of the resin based on valence relationships. For example, ferric chloride would occupy a site and then react with the hydroxides of at least 2 and possibly 3 additional sites to become immobilized such that the potential loading is reduced to a fraction of what it would have been if the resin was used in its chloride or neutral salt form.

Examples of suitable strong base anion exchange resins are known in the art and are disclosed in Samuelson, Ion Exchange Separations In Analytical Chemistry, John Wiley & Sons, New York, 1963, Ch. 2, incorporated herein by reference. Preferred anion exchange resins are those resins having a chloride counter ion whereby the resin is in the counter ion form before the start of the process or converted to that form during the during the exchange process. Hence, preferred anion exchange resins are those resins having quaternary amine exchange groups chemically bound thereto, for example, styrene-divinyl benzene copolymers substituted with tetramethylamine.

Preferred anion exchange resins also include crosslinked polystyrene substituted with quaternary amine such as the ion exchange resins sold under the trade names AMBERLITE IRA-400 by Rohm and Haas Company and DOW SBR by Dow Chemical Company or ResinTech SBG1. Such resins are typically sold in a variety of ionic forms. The term "ionic form" refers to the counter ion attached to the charged functional group of the resin. Virtually any negatively charged ion can become a counter ion. Some examples of counter ions are chloride, hydroxide, carbonate, bicarbonate, sulfite, bisulfite, sulfate, bisulfate, borate, iodide and complexed iodide/iodine. Those of ordinary skill in the art will recognize that the counter ion is often included in the name of the resin, with the possible exception of the chloride ion, which is a de facto standard form for most strong base resins. For example, ResinTech SBG1-OH is ResinTech SBG1 with hydroxide counter ions. ResinTech SBG1-HCO$_3$ is ResinTech SBG1 with bicarbonate counter ions. Likewise, ResinTech SBG1-Cl is ResinTech SBG1 with chloride counter ions. Typically, strongly basic resins are supplied in the chloride form unless other counter ion forms are specified. When a strong base resin is supplied in the chloride form (with chloride counter ions), it is common practice to use only the product name without mentioning the ionic form. For example, ResinTech SBG1-Cl is referred to as simply ResinTech SBG1.

Examples of anion exchange materials suitable for the present invention also include:

strong base cross-linked Type I anion exchangers; certain weak base cross-linked anion exchangers which can exchange the complex or have some strongly basic functionality that can exchange the complex; strong base cross-linked Type II anion exchangers; strong base/weak base anion exchangers; strong base perfluoro aminated anion exchangers; and naturally occurring anion exchangers such as certain clays. The anion exchange materials can be a strongly basic resin with acrylic or styrenic polymer having a variety of amine exchange groups including, but not limited to, trimethylamine, triethylamine, tributylamine, dimethylethanolamine, dimethylamine and trihexylamine.

Strongly basic anion-exchange resins can be quaternary amine resin containing $CH_2N(CH_3)_n{}^+X^-$ groups, that is the type known as Type I resin. Type II resins, which contain $CH_2N[(CH_3)_2(CH_2CCH_2OH)]^+X^-$ groups, may also be used effectively. The anion exchange material is said to be in the chloride form when $X^-$ is the chloride ion ($Cl^-$). However, after regeneration according to one method of the present invention, $X^-$ represents hydroxyl ion $OH^-$, and the anion material is said to be in the hydroxide form. The anion active resins may be activated or regenerated by passing a dilute solution, for example, 0.1%-20% of sodium carbonate, caustic soda, potassium carbonate, potassium hydroxide, organic bases and the like through the bed and subsequently washing with water.

Examples of suitable resins are gel-type anion exchange resins which contain primary, secondary, tertiary amine and quaternary ammonium groups. Such resins include Amberlite IRA-400, Amberlite IRA-402, Amberlite IRA-900, Dowex I, Dowex 21K, Ionac A540, and Amberlite IRA-68, Dowex SBR, Dowex SAR, Dowex SBR-P, Dowex MSA-1, ResinTech SBG1, ResinTech SBG1-P, ResinTech SBG2, ResinTech SBACR, ResinTech SBMP1, ResinTech WBACR, ResinTech WBG30 and ResinTech SIR-22P.

Macroporous resins can also be used effectively in preparing the modified anion exchange materials of the present invention. Some of the macroporous resins which can be used effectively are those listed in Ullmann's Encyclopedia under the heading "Strong Base anion resins—macroporous types."

Other commercially available anion exchange resins which are useful in the present invention include: Purolite anion exchange resins A-600, A-400, A-300, A-300E, A-400, A-850, and Rohm & Haas resins IRA-400, IRA-402, and IRA-904; and Dow resins SBR, SAR, and Dowex II, Ionac ASB-1, Duolite A-109 and the like.

As referred to in U.S. Pat. No. 4,366,261, still other effective commercial anion resins are discussed in the Kirk-Othmer Encyclopedia of Chemical Technology, Vol. II, pages 871-899 on the subject of "Ion Exchange." Yet another helpful reference is a book titled "Ion Exchange" by F. Helfferich published by McGraw-Hill, 1962. Additionally, detailed information about pore sizes of "gel-type," "microreticular," and "macro reticular" ion exchange resins may be found in "Ion Exchange in The Process Industries" published in 1970 by The Society of Chemical Industry, 14 Belgrave Square, London, S.W.I., England.

Any other anion active resin may be used in making the modified anion exchange materials of the present invention including but not limited to: m-phenylene diamine-formaldehyde resins, polyamine-formaldehyde resins, alkyl and aryl substituted guanidine-formaldehyde resins, alkyl and aryl substituted biguanide, and guanyl urea-formaldehyde resins, for example, corresponding condensation products of other aldehydes, for example, acetaldehyde, crotonaldehyde, benzaldehyde, furfural or mixtures of aldehydes may also be employed if desired. The resins such as those prepared from the guanidine, guanyl urea, biguanide, the polyamines, and other materials which do not form substantially insoluble condensation products with formaldehyde for most practical purposes are preferably insolubilized with suitable materials, etc., urea, aminotriazines, especially melamine, the guanamines which react with formaldehyde to produce insoluble products, etc. Furthermore, mixtures of the anion active materials as well as mixtures of the insolubilized materials may be used.

Usually it is convenient to employ the salts of the bases but the free bases may also be used effectively. Examples of suitable salts are: guanidine carbonate, guanidine sulfate, biguanide sulfate, biguanide nitrate, guanyl urea sulfate, guanyl urea nitrate, guanyl urea carbonate, etc.

The anion active resins may be prepared in the same general manner as that described in either U.S. Pat. No. 2,251,234 or 2,285,750. Most preferably, the starting anion exchange material is a strong base, styrenic polymer, gel-type resin. Any anion exchange material will remove, for example, arsenic from a contaminated water source. However, commercially available anion exchange materials, including the anion exchange resins described above, allow the arsenic to be displaced from the anion exchange materials by other ions present in the water source, most notably sulfate, such that the anion exchange materials are capable of only a very limited throughput and if it becomes overrun, it will "dump" the arsenic. Dump is a chromatographic term used in the art describing the mechanism be which an ion of higher preference displaces an ion of lower preference which then comes out of the resin at concentrations higher than the inlet. In contrast, the modified anion exchange materials of the present invention do not dump arsenic under any typical potable water chemical environment.

Without intending to be limited to the following description, the present invention includes any anion exchange material, preferably a strongly basic anion exchange resin, most preferably a strongly basic gel type anion exchange resin, that contains at least one metal inside the anion exchange material yet the anion exchange material remains available to take place in chemical reactions, redox reactions and chemical sorption reactions. That is, the anion exchange material retains its original anion exchange characteristics and, therefore, the anion exchange material may or may not take part in the reaction process involving, for example, the removal of a contaminant by the metal itself. Preferably, the starting anion exchange material contains at least one amine exchange group selected from the group consisting of trimethylamine, triethylamine, tripropylamine, tributylamine, dimethylethanolamine, dimethylamine, trihexylamine and methylamine. For example, an ion exchange material made with triethylamine functional groups has reduced selectivity for certain ions or classes of ions. This type of resin has a reduced affinity for multivalent ions and is useful in removing nitrate from potable water. In such applications, sulfate is a major potential interfering substance. A resin with a reduced affinity for sulfate has benefits over ordinary resins, which prefer sulfate over nitrates. A tri-ethylamine based resin is often referred to as being "nitrate selective" because of its ability to resist sulfate interferences. When a resin, based on tri-ethylamine functionality, is treated by the method of the present invention, it continues to function as a nitrate selective resin with an additional functional ability of removing arsenic selectively. In other words, the resin becomes a dual use resins, nitrate selective and arsenic selective. In a similar manner, other special purpose ion exchange resin can have an added functionality of becoming arsenic selective by the process described herein.

The metals or contaminants which are effectively displaced, suspended, precipitated or immobilized inside the anion exchange material referred to above may be, for example, a transition-type metals including, but not necessarily limited to, copper, cobalt, nickel, titanium, zirconium, cadmium, cerium, ruthenium, rhodium, rhenium, molybdenum, aluminum, lithium, gallium, lanthanum, manganese, tin, palladium, platinum, gold, mercury and, preferably, iron. Some light metals, non-metals, and their ions, including both monovalent and polyvalent ions, are also within the purview of the present invention.

The modified anion exchange materials of the present invention are capable of operating effectively in a wide pH range. For example, the modified anion exchange materials of the present invention can work effectively at a pH range of between 3.0 and 11.0, and possibly at a pH below 2.0 and above 11.0, although some decomposition of the modified resin is expected to occur below pH 3. Preferably the range of the pH is between 4.0 and 10.0, most preferably between 4.5 to 9.5, since the pH of potable water is usually in the range of approximately 5 to 9. The pH of any source coming into contact with the modified anion exchange materials should be monitored and adjusted, if necessary.

The present invention is also directed to methods of making modified anion exchange materials, including anion exchange resins, which involve "loading" a complex into an anion exchange material and then reacting the complex in a manner that leaves the metal of the metal complex precipitated or immobilized inside the anion exchange material. Thus, in the present invention, the metal complex containing anions are first loaded as anions into the anion exchange material and then further reacted while the metal is inside the anion exchange material such that the complex is broken and the metal is contained or trapped within the volume of the gel phase of the anion exchange material. As a result, the metal is immobilized and unable to easily escape or be displaced from the material. Nevertheless, the metal complex, once inside the anion exchange material, can be decomposed and the metal converted to the cationic component of an insoluble metal salt such as, for example, a hydroxide, an oxide or a sulfide.

The methods of making the modified anion exchange material of the present invention can be conducted either in a column or batch reactor. The batch method can be varied by using multiple contacts or with a single contact under proper conditions able to make a product with acceptable performance. The column method enables the amount of metal loading to be controlled by allowing a solution to reach equilibrium as it passes through a bed by varying the flow rate, composition and/or contact time. In addition, the solution containing the complex can be recirculated which allows for complete or partial use of the complex solution for producing a predefined amount of metal loaded product. Multistage contacts, by either the batch or column methods of either a resin or the solution, allow loading to occur beyond the stoichimetric limit and re-use of the spent solutions to optimize the performance of the solution and minimize waste discharge thereby improving operating efficiency during production.

The formation of a complex as a function of acid concentration for various metals is known and can be found, for example, in "Ion-Exchange—A Series of Advances," J. A. Marinsky, Vol. 1 (1966). Even at low concentrations, a sufficient complex can be formed to allow loading onto an anion resin. Thus, those of ordinary skill in the art will appreciate that virtually any acid concentration range can be used to form a complex which provides acceptable performance for use in the present invention.

Preferably, the method of making the modified anion exchange materials of the present invention involves the use of a gel type resin as a starting material. Any anionic form of a resin may be used, however, chloride, fluoride and hydroxide forms of the resin are most commonly used as starting materials. Weakly basic resins, if obtained in the free base form, are preferably converted to the acid chloride-form prior to being contacted with an aqueous metal halide that will interact with the resin causing it to behave as a strong base ion exchanger. This is conveniently done by treating the resin, under reduced pressure, with an excess of an aqueous solution of an acid, such as hydrochloric acid, wherein the salt or acid contains the anion associated with the complex. The solution can then be filtered, washed and drained off. A pressure differential across the filter may be employed to increase the draining process, if desired.

The method involves activating the anion exchange materials, for example the resin, and exchanging anionic sites of the resin with an anionic metal complex. After the metal complex is exchanged into the gel-phase, the complex is further reacted, or broken, in such a way as to keep the metal inside, for example, the bead of the resin. This can be accomplished in a variety of ways, including reacting the complex loaded anion exchange resin with one of a variety of alkaline reagents including, but not limited to, sodium hydroxide, soda ash and ammonia, and/or other metal immobilizing substances whose anion component will break the metal complex and precipitate or immobilize the metal including, but not limited to, hydrogen sulfide, sodium sulfide and carbamates.

Preferably, the method of making the modified anion exchange materials of the present invention involves adding a metal containing substance to a salt, acid or base material to form an anionic substance comprising a metal containing complex; loading the anionic substance comprising a metal containing complex onto an anion exchange material; and immobilizing the metal containing complex. The loading step of the anionic substance onto an anion exchange material can be done repeatedly for two or more times to approach maximum loading. Parameters which decide the maximum loading are temperature, time, porosity of the resins' gel phase, pore size of the resins' macro pores in the case of macroporous anion resins, bead size, the metal containing substance's concentration, and the composition of the solution used to form the complex.

Most preferably, the salt, acid or base material is a gel type or macroporous type, anion resin. Several different ions that form anion complexes can be used for loading the anion resin including, but not limited to, aluminum hydroxide, sodium aluminate, potassium titanium fluoride, zinc chloride, zinc hydroxide, and iron chloride. When a halogen salt or halogen based acid, or combination of both, is added to a metal halide under proper conditions the metal halide will associate with additional halides to form a metal halide complex metallic and or hydrogen ions. After the anionic metal complex is formed, the complex is loaded into an anion exchange material. The complex loaded anion exchange resin is then treated with a sulfide or, preferably, a hydroxide trapping the metal inside the anion material.

Although not a required step of the method of making the modified anion exchange materials of the present invention, a concentrated salt or acid whose composition stabilizes the metal containing complex on the resin can be used to rinse and thereby displace the metal laden solution from the anion exchange material without significantly displacing the metal from the material. For example, spent solution from a previous batch, a concentrated sodium chloride solution, sodium chloride with acid solution and sodium chloride (or chloride salt) solution can be used to displace the metal laden solution. In other words, the rinse solution could be comprised of a salt, acid, neutral or alkaline solution, for example hydroxide or chloride compounds, as long as there is a sufficient concentration of an ion that maintains the formation of the complex, prevents the complex from coming off the anion material and allows for the solution to be displaced so that the solution can be reused. Thus, the rinse solution should have a pH in a range that maintains the anionic substance comprising the complex stable. Therefore, the rinse step, while not required for methods of the present invention, does improve the chemical efficiency, ease of processing and effectiveness of loading the metal inside the anion exchange material. Preferably, after the complex has been loaded, the complex containing liquid is drained from, for example, a resin bed and reclaimed before the next step. The rinse step facilitates the method of making the modified anion exchange materials of the present invention but is not necessary to achieve the improved anion exchange materials of the present invention.

Preferably, concentrated hydrochloric acid and/or sodium chloride is added to a solution of iron chloride and water forming an aqueous iron chloride and sodium chloride and/or hydrochloric acid solution forming hydrogen ions and an iron chloride complex which can be, for example, a $FeCl_4^-$ complex. When this complex is combined with an anion exchange material, it not only is attracted to the cationic charge sites surrounding the resin but also enters the gel-phase of the resin. When this combination of the complex and the resin is further combined with a caustic or an alkaline material, such as for example sodium hydroxide or sodium sulfide, the hydroxide, for example, will enter at least a portion of the material, react with the iron and remove at least a portion of excess chloride from inside the material thereby leaving the iron inside, for example, immobilized therein, the material as $Fe(OH)_3$, as an oxide, a hydroxide or possibly as some other form of iron, or such that the immobilized iron will no longer be associated with the anion exchange sites but is rather trapped in the anion polymer matrix of the resin.

At this point, the material, which again is preferably a gel type resin, is in a mixed ionic form; that is, ions associated with the functional group of the anion exchange resin will be a mixture of an anion constituent of the complex forming solution and the alkali used to precipitate or immobilize the metal inside the resin. For example, in the method just described, the functional groups of the anion resin will be left partially in both the chloride and the hydroxide forms. Since the chloride is a mobile ion, it is free to move inside and outside the material whereas the iron, being immobilized, is trapped inside the material. As a result, the hydrochloric acid is no longer very effective at removing the iron from inside the resin because the hydrogen ion disassociated from the acid cannot easily penetrate the resin due to the Donnan barrier. However, it is also believed that some relatively small amount of the iron will slowly dissociate from inside the resin in a strong chloride solution as it is converted back to a chloride complex.

Conversely, sulfuric acid remains effective at removing the iron from inside the resin because the sulfuric acid forms hydrogen and bisulfate ions when it dissociates. The bisulfate ion ($HSO_4^-$), which carries a negative charge, is an anion. It is also an acid which forms hydrogen ions and sulfate ions. Therefore it can penetrate the Donnan barrier, enter inside the resin wherein it can liberate hydrogen ions that in turn react with precipitated ferric hydroxide to form water and ferric sulfate. Ferric sulfate is a salt consisting of positively charged ferric ions ($Fe^{+3}$) and negative charged sulfate ions ($SO_4^{-2}$). Since the ferric iron is positively charged it is expelled by electrostatic repulsion by the functional groups of the resin. The sulfate ion interacts with exchangeable ions and the resin becomes partially converted to the sulfate form which in turn reaches equilibrium with other anions, and with the resin exchange sites.

In another preferred method, zinc is loaded onto and inside of the anion material. For example, zinc chloride can be combined with concentrated hydrochloric acid to make a zinc chloride hydrochloric acid solution which is further combined with a halogen form anion resin. It will be appreciated by those skilled in the art based on the description provided above that, instead of using a halogen form of the resin, other forms of the resin could also be used including, but not necessarily limited to a carbonate, a nitrate, or a hydroxide form of the resin. Also, as described above, the intermediate product of this combination is a complex which is believed to be a positively charged resin with zinc chloride bound to it. It is further believed that the complex is only stable while it is in the presence of the concentrated hydrochloric acid or a concentrated sodium chloride solution or a mixture of both. It will be further understood by those of ordinary skill in the art that the definition of the phrase "concentrated" depends on the particular metal used in the above reaction since the solution only has to be concentrated enough to maintain the stability of the complex.

Now, if the anion resin loaded with the complex is undesirably displaced with, for example, water or a dilute acid or a dilute salt, the acid and halide concentration would be reduced such that the complex will revert to simple zinc chloride. Therefore, the zinc will become positively charged and will be rejected by the positive charges of the functional groups of the anion exchange resin. This will leave a resin in the salt form containing no zinc and a solution of zinc chloride in a dilute sodium chloride and/or hydrochloric acid. If the resin is then neutralized, very little zinc will stay in the resin and the amount of zinc which remains on the resin will be severely reduced. Thus, the complex will revert to zinc chloride. As a result, the zinc will become positively charged and will be rejected by the positive charges of the functional groups of the anion exchange resin. This will leave a resin in the salt form containing no zinc and a solution of zinc chloride in a dilute sodium chloride and/or hydrochloric acid solution.

Alternatively and preferably, the complex forming solution is drained from the anion exchange resin after the loading process has been completed. This enables solution to be reused in, for example, subsequent batches. After draining the complex forming solution from the resin, a small amount of the solution will remain on the surface of the resin. Preferably, the remaining solution is removed by rinsing with a concentrated salt solution whereby a small amount of hydrochloric acid has been added or spent solution from a previous batch and the concentration is sufficient to maintain the stability of the complex loaded on the resin. Although, reference is made to sodium chloride and hydrochloric acid, it will be understood that the anionic constituents of the salt and the acid would be virtually identical to the anionic constituents of the complex actually loaded onto the resin. A resin bed, for example, is rinsed with the salt solution or simply drained until the bulk of the remaining complex containing solution has been removed. An alkali can then be added thereby producing a modified anion exchange resin in the presence of sodium chloride. It is believed that the resin is in both the chloride form (resin-zinc chloride) and, to a certain extent, in the ionic form of the alkali used to break the complex and immobilize the metal. It is understood by those of ordinary skill in the art that zinc can form soluble anionic complexes in alkaline solutions such that precipitation of zinc chloride by hydroxides requires careful control of concentration and pH for best results in the immobilization step. Further, concentrated hydroxide solutions can be used to form the complex while also acting as the loading solution for zinc on the resin. It can also be precipitated by neutralization with a mild alkali, acid or another agent such as sulfide. The remainder of the zinc will be immobilized in the form of zinc oxide, zinc hydroxide, sulfide or possibly some other non-soluble form of zinc.

It is pointed out that, instead of using caustic to immobilize zinc, sodium sulfide can be used as an alternative which, of course, would form zinc sulfide. Similarly, any soluble hydroxide or sulfide could also be used instead of caustic in the precipitation step of the present invention. Further, any soluble ionized substance containing an anion component that immobilizes or precipitates with the metal that was loaded onto the anion resin, which in this case is zinc can be used.

It will be understood by those of ordinary skill in the art that the ratio of the complex forming chemicals affects the loading characteristics of the metallic complex. For example, if the iron concentration is very low it could inhibit loading despite the high concentration of complexing agent. Thus, it will be understood that, if the complexing agent (e.g., chloride), concentration is reduced significantly, the formation of the complex will be impaired which can affect the loading level of the iron. However, the process of forming and loading the complex is very favorable and can therefore be performed satisfactorily despite less than optimal or favorable conditions. This is demonstrated by the examples below which show that ferric chloride alone is able to load complexed iron onto a resin despite limited complex formation in a solution. Water hydration of a resin will be partially extracted from the resin and the solution will become more dilute due to the interaction between the resin and the solution. The liberated water reduces the concentration of the solution which reduces the loading potential and, in some cases, may destabilize the anionic form of the metallic complex. It also increases the volume of the solution making it more difficult to reclaim. This can be overcome by a pre-rinse with a saturated or near saturated salt or concentrated acid solution or with the spent solution from a previous loading cycle or a non-ionic substance such as an alcohol that is water soluble and can pass thru the Donnan barrier to extract water from the gel phase of the resin.

It will also be understood by those of ordinary skill in the art that kinetics also plays an important part in the present invention. Flow rates and temperature affect equilibrium conditions for each concentration including the concentration ratio of complexing agent to metal (e.g., chloride to iron). In addition, other environmental factors, such as pH, can play an important role in the loading process. Changing the flow rate of the solution or the contact time between the solution and the resin will affect the amount of metal loaded. For example, higher flow rates result in shorter contact times which result in lower loading of the complex. Likewise, changing the solution composition affects both the loading and the rate of loading of the complex metallic anion. As the loading of the metric complex increases, the difference in the potential loading level and the solution concentration decreases. At slower flow rates and longer contact times the solution concentration is reduced which in turn reduces the driving force of the solution concentration. Also, varying the concentrations and flow rates or changing the contact times and concentrations over multiple contact stages can result in higher loading levels and lower overall costs.

It will be further understood by those of ordinary skill in the art that, when batch-loading techniques are employed, multiple stages of contact can reduce the cost by increasing the chemical efficiency. The resin and the solution react so that equilibrium can be reached. In order to avoid large excesses of metal, a multi-stage process based on re-use of the metal salt from previous batches as a preliminary feed solution can virtually eliminate discharge of metallic salts during the process. The partially depleted solution from the previous batch can be used to precondition the resin in the next batch. Similarly, in columnar-loading techniques allow for the re-claim and re-use of partially spent liquids from previous loading cycles which can increase chemical efficiency.

It will be appreciated by those skilled in the art based on the description provided above that changes could be made to the preferred methods described above without departing from the broad invention concept thereof. For example, iron could be replaced by a metal selected from the group consisting of copper, titanium, zirconium, aluminum, manganese, tin, platinum, palladium, gold and mercury, as well as any other transition type metal. Additionally, there are numerous other reactions which can be effectively used without departing from the scope of the present invention. Attached hereto is a portion of a publication entitled "Ion Exchange—A Series of Advance," J. A. Marinsky, Vol. I (1966), which provides the adsorption characteristics of various metals and, therefore, provides an understanding of the efficiency at which various metals form the modified anion exchange materials of the present invention.

In its simplest form, the method of making the modified anion exchange materials of the present invention comprises the steps of: loading an anionic substance comprising a metal containing complex onto an anion exchange material; and immobilizing or precipitating the metal containing complex inside the anion exchange material to form a modified anion exchange material. Additional steps can be introduced to this method including, but not necessarily limited to: adding a metal containing substance to a salt, acid or base material to form the anionic substance comprising the metal containing complex; displacing excess metal of the complex; converting the metal complex to at least one of a metal cation, a metal oxide, a metal sulfide, a metal hydroxide and an insoluble form of the metal complex.

The present invention further relates to methods of removing and recovering at least one metal or contaminant from a source, comprising the steps of: loading an anionic substance comprising a metal containing complex onto an anion exchange material; immobilizing a metal complex to form at least a portion of a metal containing substance inside the anionic substance; and contacting the source with at least a portion of the metal containing anionic substance. Moreover, it is within the scope of the present invention to provide an ion exchange material apparatus or container which contains the improved anion exchange material of the present invention which is made according to the method described above. It will be appreciated by those skilled in the art that additional steps can be added, or the steps mentioned repeated, to the methods described above without departing from the broad inventive concept thereof.

DESCRIPTION OF SPECIFIC EMBODIMENTS AND EXAMPLES

Example 1

Ferric chloride solutions with varying amounts of water, NaCl and HCl were prepared in varying ratios of the ingredients as listed in columns A thru Im. The solutions were then combined with ResinTech SBG1 (Chloride form) and placed into a 1 liter glass beaker fitted with a magnetic stirrer bar. A single source of resin was used in all these experiments. In experiments A thru G, the resin was pre-rinsed with an equal amount of saturated NaCl ("brine") solution. It was determined by experimentation that this treatment would remove a large amount of water from the resin causing it to shrink substantially. Tests determined that the shrinkage was 14.9%. Sufficient resin was prepared by passing an equal volume of saturated NaCl solution through the resin to supply experiments A thru G. The actual volume of brine treated resin was 85.1% of the designated 200 mL in experiments A thru G. This is equivalent to starting with 200 mL of Cl form SBG1 and pre-rinsing it with 200 mL of saturated NaCl. This pre-treatment reduced the chemical bound water content of the resin and reduced the tendency of the resin to become dehydrated and thereby diluting the liquids during the iron-loading step. No brine pre-rinse was used for Bm, Hm or Im.

The mixtures were stirred at sufficient speed to keep the resin slurry moving and to insure constant motion of the liquid throughout the resin particles for 24 hours. The solution was removed from the resin by filtration leaving the resin free of liquid, in the ferric chloride complex form ($FeCl_4$). The iron content of the ferric chloride complex was then fixed in the resin by combining the resin with a 25% solution of NaOH in an amount equal to 40 to 50% of the resin volume. For example, if the starting resin volume was 200 ml, then at least 80 mL of the solution was added to the resin. The resin and NaOH solution was then stirred for one and one half hours. During this time, the temperature of the mixture increased due to the concentrated caustic becoming diluted, the ferric chloride complex decomposing and reacting with the NaOH and the resin absorbing water from the solution. The rate of ferric chloride complex moving from the resin towards the surface of the resin bead is much slower than that of the hydroxide ion moving into the resin. In other words, the hydroxide ion can get to the iron and precipitate inside the resin before the iron complex can decompose and dump iron from the resin as a rejected cation. Combining the resin with the NaOH solution quickly and maintaining agitation to constantly expose the resin to fresh unspent NaOH to minimize iron losses are important steps during the NaOH fixing process. The temperature reached a peak at about one hour and stayed constant for several minutes before slowly cooling. After one and one half hours, the mixture of hybrid resin and NaOH solution had cooled nearly returning to room temperature.

The resulting mixture contained a small amount of precipitated iron sludge from reaction of the excess ferric chloride solution with the NaOH used to fix the iron in the resin. The resin product was separated from the remaining NaOH liquid and precipitated iron sludge by a combination of rinsing, stirring and backwashing using approximately 5 times the volume of the resin. Then the resin was rinsed with a small amount of dilute HCl to remove any leftover NaOH, the resin was returned to the Cl form, and remaining surface bound iron was dissolved from the surface of the resin. The final product was clear, very dark in color and transparent as was the starting resin. In the case of a macroporous resin that is opaque, the resin would have remained opaque.

Experiments A thru G were conducted to determine the impact of lowering the water content of the system while varying the ratio of chloride to iron/resin ratio. In addition, the source of chloride was varied between NaCl and HCl. Experiments Bm, Hm and Im were designed to measure the effect of higher ratios of water to ferric chloride and resin.

|  | A | B | C | D | E | F | G | Bm | Hm | Im |
|---|---|---|---|---|---|---|---|---|---|---|
| 30% HCl, mL | 15 | 168 |  | 30 |  |  |  | 67 | 33.6 | 67.2 |
| 37% FeCl3 Solution, mL | 320 | 320 | 320 | 320 | 320 | 320 | 320 | 128 | 128 | 128 |
| Granular Salt, grams |  |  |  |  |  | 75 |  |  |  |  |
| Saturated (NaCl) Brine, mL | 152 | 0 | 152 | 0 | 0 | 0 |  |  |  | 61 |
| Deionized Water, mL |  |  |  |  |  |  |  |  |  |  |
| Resin, mL (Cl)* | 200 | 200 | 200 | 200 | 200 | 200 | 200 | 80 | 80 | 80 |
| Fixed Iron content, grams Fe/L of resin | 68-73 | 78-91 | 66-71 | 62-70 | 35-37 | 33 | 57 | 19 | 23 | 19-20 |

*(174 mL of brine pre-treated resin was used based on 14.9% shrinkage in experiments A, B, C, D, E, F, & G)

Example 2

A solution comprised of 120 milliliters of 36% ferric chloride and 200 milliliters of saturated sodium chloride (26.4% NaCl) was passed slowly through a column of 200 milliliters of ResinTech SBG1. The solution is then drained from the resin bed. Next, a solution containing 60 mL of 50% NaOH and 120 mL of deionized water is added to the resin bed and the mixture of resin and solution was mixed for about 1.5 hours. The solution was then drained from the resin bed and the resin bed was rinsed with deionized water to remove any remaining solution and externally precipitated iron from the resin bed.

Example 3

A solution comprised of 120 milliliters of 36% ferric chloride and 200 milliliters of saturated sodium chloride (26.4% NaCl) and 7 milliliters of 30% HCl was passed through a column of 200 milliliters of ResinTech SBG1, over a period of 8 hours. The solution was then drained from the resin bed leaving less then 10% of the resin showing signs of liquid. Next, a solution containing 60 mL of 50% NaOH and 120 mL of deionized water was added to the resin bed and the mixture of resin and solution was mixed for about 1 hour. The solution was then drained from the resin bed and the resin bed is backwashed, air mixed and rinsed with deionized water to remove any remaining solution and externally precipitated iron from the resin bed. The resulting product is expected to contain approximately 70 grams of iron per liter of resin.

Example 4

A solution comprised of 120 milliliters of 36% ferric chloride plus 200 milliliters of saturated sodium chloride (26.4% NaCl) and 7 milliliters of 30% HCl was passed through a column of 200 milliliters of ResinTech SBG2. The solution was then drained from the resin bed. Next, a solution containing 60 mL of 50% NaOH and 120 mL of deionized water was added to the resin bed and the mixture of resin and solution was mixed for 1 hour. The solution was then drained from the resin bed and the resin bed was rinsed with deionized water to remove any remaining solution and externally precipitated iron from the resin bed. The resulting product is expected to contain approximately 70 grams of iron per liter of resin.

Example 5

A solution of 120 milliliters of 36% ferric chloride plus 200 milliliters of saturated sodium chloride (26.4% NaCl) was passed through a column of 200 milliliters of ResinTech SBMP1. The solution was then drained from the resin bed. Next, a solution containing 60 mL of 50% NaOH and 120 mL of deionized water was added to the resin bed and the mixture of resin and solution was mixed for about 1 hour. The solution was then drained from the resin bed and the resin bed was rinsed with deionized water to remove any remaining solution and externally precipitated iron from the resin bed. The resulting product is expected to contain approximately 60 grams of iron per liter of resin.

Example 6

A hydroxide form strong based anion resin (e.g., SBG1-OH) was placed in a process vessel. Ferric chloride solution (30-40%) containing a slight excess of hydrochloric acid was passed through the resin until the desired concentration (30-40%) was achieved at outlet of the vessel. The remaining solution was then drained from the vessel. A 10-20% sodium chloride solution was then passed through the vessel to remove excess ferric chloride.

Alternatively, deionized water may be used with some sacrifice of ferric chloride loading on the resin. The purpose of this step is to remove excess ferric chloride on the outside of the resin beads, thereby minimizing the rinse volume required in later steps. This rinsing step is not essential to the process. It is noted that when water is used, the possibility of breakdown and removal of virtually all the iron from the resin exists, especially when warm water and long contact times are employed. Conversely, cold water and short contact times will reduce the amount of lost iron. Also, it is often preferable to omit the salt or water wash step.

Continuing, the vessel is drained of any remaining solution. The vessel was then re-filled with a 20-30% solution of a strongly basic material, such as sodium hydroxide. It will be noted that the material needs to be mixed so that the resin and the liquid remain intermixed and that sufficient solution is used to neutralize all of the ferric chloride complex that is on the resin. The solution and resin were then stirred and allowed to react for 30-60 minutes. The remaining solution was then drained from the vessel. A series of rinse and backwash steps was then employed to remove precipitated ferric chloride from the surface of the beads. This step can be accomplished with deionized water, soft water or a salt solution. Next, pH buffering was employed to ensure that the resin is at about neutral pH such that it complies with potable water requirements (it is not essential for the removal of arsenic or for the fixation of iron on the resin). The resin was covered with water and sodium bicarbonate (or another mildly alkaline material) to adjust the pH to the potable water range (usually between pH 6 and 9). A final rinse with soft or deionized water was then employed to remove any trace levels of externally precipitated iron and to remove the excess salt from the resin.

Example 7

A hydroxide form of a strong base anion resin was added to a process vessel and covered with 30-40% ferric chloride solution containing a slight excess of hydrochloric acid. The solution was stirred for about one hour. While stirring, additional solid ferric chloride was added to increase the concentration of the solution to approximately 40% or greater. Sufficient excess hydrochloric acid was added to maintain a slight excess over the amount required to maintain the ferric chloride in solution. The solution was stirred for 1-2 hours, after which the ferric chloride solution was drained from the resin after which the method of Example 6 was followed.

Example 8

The chloride form of a strong base anion resin was placed in a process vessel and covered with 30-40% ferric chloride solution. Additional solid ferric chloride was added to increase the solution concentration to approximately 40%. The solution was then stirred for approximately 8 hours. (Alternatively, the solution could be gently heated to approximately 50° C. and stirred for 1-2 hours.) Then, the method described in either Example 6 or Example 7 is followed. The resulting product is expected to contain 40 grams of iron per liter of resin.

Example 9

A solution of 120 milliliters of 36% ferric chloride and 200 milliliters of saturated sodium chloride (26.4% NaCl) was passed through a column of 200 milliliters of ResinTech SIR-100, which is a resin based on triethylamine functional groups used for nitrate removal applications because of its preference for nitrates over sulfates. The solution was then drained from the resin bed. Next, a solution containing 60 mL of 50% NaOH and 120 mL of deionized water was added to the resin bed and the mixture of resin and solution was mixed for about 30 minutes. The solution was then drained from the resin bed and the resin bed was rinsed with deionized water to remove any remaining solution and externally precipitated iron from the resin bed. The resulting product is expected to retain its nitrate selectivity and also have improved arsenic removal capability.

Example 10

A solution of 120 milliliters of 36% ferric chloride and 200 milliliters of saturated sodium chloride (26.4% NaCl) was recirculated through a column of 200 milliliters of ResinTech SBG1 for about 2 hours. The solution was then drained from the resin bed. Next, a solution containing 60 mL of 50% NaOH and 120 mL of deionized water was added to the resin bed and the mixture of resin and solution was mixed for about 1 hour. The solution was then drained from the resin bed and the resin bed was rinsed with deionized water to remove any remaining solution and externally precipitated iron from the resin bed. The resulting product is expected to contain approximately 50 to 60 grams of iron per liter of resin.

Example 11

In a similar manner as described in Example 2, a solution comprised of 120 milliliters of 36% ferric chloride, and 200 milliliters of saturated sodium chloride (26.4% NaCl) was passed directly through a column of 200 milliliters of ResinTech SBG1. However, the solution flow rate was slowed so that the contact time was at least 8 hours. The solution was then drained from the resin bed leaving less then 10% of the resin showing signs of liquid. Next, a solution containing 60 mL of 50% NaOH and 120 mL of deionized water was added to the resin bed and the mixture of resin and solution was mixed for about 1 hour. The solution was then drained from the resin bed and the resin bed was rinsed with deionized water to remove any remaining solution and externally precipitated iron from the resin bed. The resulting product is expected to contain approximately 80 to 90 grams of iron per liter of resin.

Example 12

The spent solution from Example 10 was saved in two stages. In a similar manner as in Example 10, fresh solution was made but the solution volumes were reduced by 30%. The resin was first treated with the first stage reclaim liquid from Example 10, then with the second stage reclaim liquid of Example 10, and finally with the freshly made solution having the same composition used in Examples 10 but using only 70% as much. The flow rate was approximately the same as in Example 2. The combined contact time for all the solutions was several hours. The chemical efficiency of this process is expected to be about 100%.

Example 13

Solutions (960 mls of 37% ferric chloride) were mixed with 456 mls of saturated sodium chloride solution and then combined with 600 mls of ResinTech SBG1 (chloride form) that had previously been pre-rinsed with saturated sodium chloride brine and placed into a 2 liter Teflon beaker fitted with a magnetic stirrer bar. The mixture was stirred at sufficient speed to keep the resin slurry moving and to insure constant motion of the liquid throughout the resin particles for 24 hours. The solution was removed from the resin by filtration leaving the resin free of liquid, in the ferric chloride complex form ($FeCl_4$).

The iron content of the ferric chloride complex was then "fixed" in the resin by combining the resin with a 400 mls of a 25% solution of NaOH. The resin and NaOH solution were then stirred for about two hours. The resin product was separated from the remaining NaOH liquid and precipitated iron sludge by a combination of rinsing, stirring and backwashing of the resin. A small portion of the resultant resin was tested and found to have 56 grams/liter of iron.

The remaining resin from the first loading was pretreated with 1 bed volume of saturated brine, then mixed with a solution made from 960 mls of 37% ferric chloride and 456 mls of saturated brine and stirred for 24 hours. After about 24 hours, the resin was separated from the solution, mixed with 400 mls of 25% NaOH, stirred for about two hours, and then rinsed with water to remove excess iron and caustic. A small portion of the resin was tested and found to have 106 grams/liter of iron.

The remaining resin from the second loading was pretreated with 1 bed volume of saturated brine, mixed with a solution made from 960 mls of 37% ferric chloride and 456 mls of saturated brine, and stirred for 24 hours. After about 24 hours, the resin was separated from the solution. The resin was then mixed with 400 mls of 25% NaOH and stirred for about two hours, and then rinsed with water to remove excess iron and caustic. A small portion of the resin was tested and found to have 134 grams/Liter of iron.

Example 14

A hydroxide form of SBG1 (e.g., ResinTech SBG1-OH) was neutralized with 5 to 10% hydrofluoric acid (HF) in order to convert the resin into the fluoride form. The fluoride form resin was allowed to contact a solution of titanium potassium fluoride dissolved in 7 molar hydrofluoric acid for two or more hours. The solution was then drained from the resin. A solution of about 20% sodium hydroxide was then added to the resin and allowed to react while mixing for about two hours. The resin was then transferred to a column. Excess fluoride was removed from the resin by washing with a 10% sodium chloride solution. Precipitated titanium fluoride on the outside of the resin was then removed by additional rinsing.

Finally, it will be appreciated by those skilled in the art that changes could be made to the embodiments described above without departing from the broad invention concept thereof. It will further be appreciated by those skilled in the art based on the description provided above that one or more of the individual steps described above could be eliminated with various degrees of success based on the emphasis placed on the operating conditions and effectiveness of the other steps leading to various degrees of effective performance and productivity. It is understood, therefore, that this invention is not limited to the particular embodiments disclosed, but is intended to cover modifications within the spirit and scope of the present invention.

We claim:

1. A method for making a modified anion exchange material comprising the steps of:
    (a) loading an anionic substance comprising a metal containing complex onto an anion exchange material; and
    (b) immobilizing at least a portion of the metal of the metal containing complex inside the anion exchange material to form a modified anion exchange material.

2. The method of claim 1, further comprising the step of adding a metal containing substance to a salt, acid or base material to form the anionic substance comprising the metal containing complex.

3. The method of claim 1, further comprising the step of displacing excess metal from the metal containing complex.

4. The method of claim 1, further comprising the step of converting the metal containing complex to at least one of a metal cation, a metal oxide, a metal hydroxide and an insoluble form of the metal containing complex.

5. The method of claim 1, further comprising repeating the loading and immobilizing steps.

6. The method of claim 1, wherein the immobilizing step comprises adding an immobilizing reagent to the anionic substance comprising a metal complex and the anion exchange material.

7. The method of claim 6, wherein the immobilizing reagent is selected from a group consisting of a hydroxide, carbonate, bicarbonate, acids and salts.

8. The method of claim 3, wherein the displacing step comprises rinsing the anionic substance with a solution that stabilizes the complex.

9. The method of claim 1, wherein the anion exchange material is a strong base anion resin.

10. The method of claim 9, wherein the metal is immobilized in a gel phase of the resin.

11. The method of claim 1, wherein the anion exchange material is mostly in a halogen form.

12. The method of claim 1, wherein the metal of the metal containing complex is at least one of iron, zinc, copper, titanium, lanthanum, beryllium, zirconium, aluminum, manganese, tin, palladium, platinum, gold and mercury.

* * * * *